May 21, 1963      T. LOEW      3,090,048

FABRIC FACE PLASTIC BELTING

Filed July 2, 1959

INVENTOR.
THEODORE LOEW
BY
ATTORNEY

United States Patent Office 3,090,048
Patented May 21, 1963

3,090,048
FABRIC FACE PLASTIC BELTING
Theodore Loew, Stamford, Conn., assignor to Cee Bee Manufacturing Co., Inc., Brooklyn, N.Y., a corporation of New York
Filed July 2, 1959, Ser. No. 824,683
6 Claims. (Cl. 2—338)

The present invention relates to a fabric face plastic belting and it particularly relates to a method of making a fabric facing substantially integrally joined with a plastic base so as to form a flexible belting which has body yet is relatively flexible.

It is among the objects of the present invention to provide a novel fabric face plastic belting in which an elongated body element of plastic or plasticized material is enclosed in a fabric backing so as to give a belting construction of substantial flexibility, yet great rigidity, which may be utilized for women's dress belting or other wearing apparel such as straps for handbags and the like.

Another object is to provide a novel belting construction having a flexible plastic body which is completely enclosed in an attractive fabric, which may match the dress or wearing apparel or be used in handbag straps or in other connections so that the fabric facing will be of a desired color or design of fabric.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects the basic element consists of a strip of plastic impregnated fabric material, desirably having a smooth face on one side and a roughened or uneven face on the other side, which then is fully covered on the smooth face and edges by a fabric and partly covered on the other face by the inturned edges of the fabric which are desirably serrated or scored in such a way that the end or terminal portions thereof may be pressed into the plastic material, forming a substantially permanent engagement.

Then desirably a similarly folded fabric structure is positioned on top of the inwardly turned, open side, where the ridged or corrugated plasticized face is exposed, and this structure is again pressed into the plastic facing, with the result that a substantially permanent union of the inturned fabric strips is formed with the plastic backing.

Desirably, the fabric is first covered over the smooth face, turned inwardly, and then hot-pressed into the body of the plasticized fabric base.

Then secondly the inturned edged fabric covering is similarly assembled with, and has its serrated edges extending over the plastic face, and a substantially permanent union is formed.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 2:
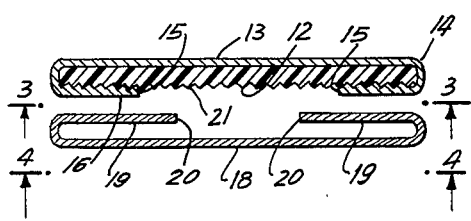
FIG. 2 is a transverse sectional view upon the line 2—2 of FIG. 1, but also showing the covering strip folded inwardly before application to the partly covered base strip.

Referring to FIGS. 1 to 5, there is shown a plastic backing 10, which may have a smooth face 11 and a corrugated or roughened face 12. This may consist of a strip of polyethylene or polypropylene. Other thermoplastic resins may be employed.

The fabric facing 13 has a bias weave, as indicated at 14, and a pinked edge 15, and it is first applied to the smooth side 11 and then folded over around the corners as indicated at 14 by a suitable folding member and then the pinked edges 15 are turned under, as indicated at 16.

Then the unit is pressed so that the points 17 of the pinked edges 15 are pressed into the corrugated plastic face to form a permanent junction at the same time the rest of the fabric 13 is thermoplastically caused to adhere to the body 11.

Figure 3:
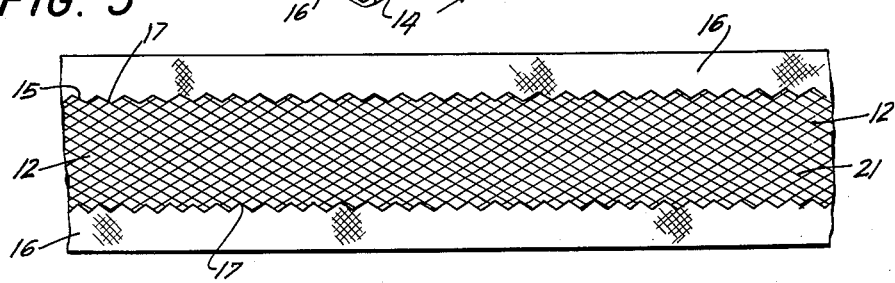
FIG. 3 is an inside view of the base strip taken upon the line 3—3 of FIG. 2 before application of the covering strip.

Then the heat united strip, as shown in FIG. 3 and in the upper part of FIG. 2, is joined with another edge folded strip 18 having the inwardly folded portions 19 with the pinked edges 20.

Figure 5:
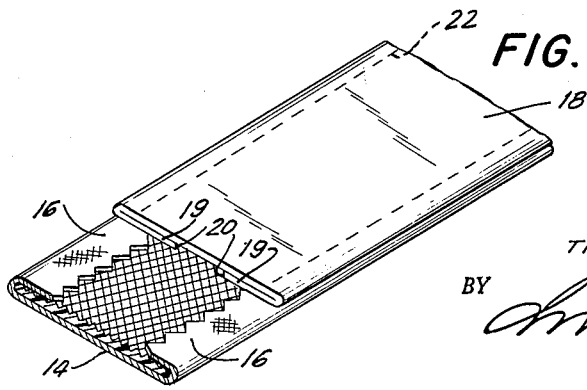
FIG. 5 is a top perspective view, showing the assembly of the covered base strip and the covering strip assembly together to form the final belt.

The pinked edges 20 extend beyond the pinked edges 15 so that they will overlie or be positioned against the exposed face 21 between the pinked edges 15, and a second application of heat causes a union of the two elements in FIG. 2 to form the belt structure of FIG. 5.

By the overlapping of the pinked edges 15 and 20, the points in both instances are embedded into the corrugated or roughened face 12 of the polyolefin plastic base strip 10 to give a substantially unitary structure as shown in FIG. 5.

The structure as shown in FIGS. 1 to 4 may be used without stitching but where stitching is to be applied at line 22 in FIG. 5, it may be applied under certain instances.

The fabric face on opposite sides of the belt may be of the same design or different design or may match different accessories.

The entire junction may be formed by first folding the strip 13 around the base 10 and then folding and assembling the strip 18 with the base assembly of FIG. 3 after heat has been applied thereto.

Where the pinked edges 15 may be held in by suitable folding mechanism, the upper and lower strips 13 and 14 may be simultaneously fed in.

There it is folded inwardly. The heat application takes place at the same time so that both pinked edges 15 and 20 are imbedded into the plasticized belt fabric.

The inside member is desirably an extruded strip of a polyolefin, such as polyethylene or polypropylene desirably a 50–50 mixture of the high and low density materials, which density is controlled by the amount of cross linking and polymerization.

At least one side is embossed while still hot and at a temperature of 350 to 400° F. and the fabric 14 is combined with the extruded strip while still at about the same temperature.

Desirably the material is permitted to cool before the additional fabric strip 18 is added and then the heat is applied from the outside by heated calendar rolls to give surface heating of about 350 to 400° F.

It is thus apparent that the applicant has formed a novel belt structure having wide utilization in the field of women's wearing apparel or in straps for handbags.

The polyethylene or polypropylene may have small quantities of ½ to 1% of nitrogenous compounds therein, such as guanidines.

There is also added about ½ to 2% of finely divided powdered silica to the material before extrusion.

Up to 5% of lamp black, titanium dioxide, chrome green or yellow, monastral red and cyanide blue or green in finely divided form may be included.

Figure 1:
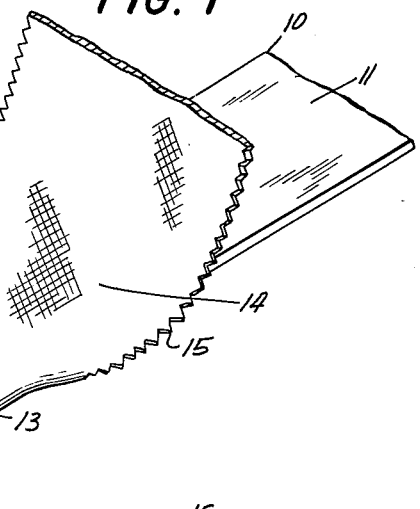
FIG. 1 is a top perspective view, showing the assembly of the fabric with the plastic strip with the edges outturned to better illustrate the construction.
Figure 4:
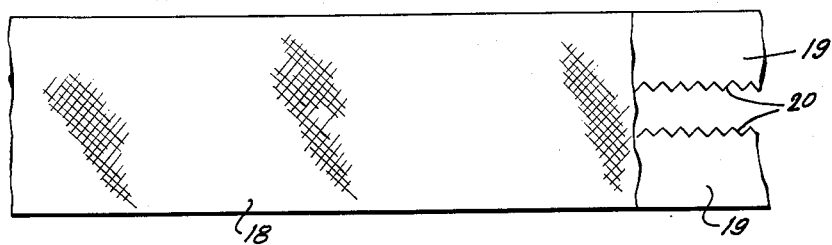
FIG. 4 is a top plan view of the covering strip partly broken away to show the construction.

Desirably both the fabric facing 13 as well as the fabric backing 18 are as indicated bias woven or cut on bias strips with pinked edges 15 and 20, the bias being indicated in FIGS. 1, 3 and 4. The corrugations on the exposed face 21 are preferably also arranged diagonally as indicated best in FIG. 3.

As many changes could be made in the above fabric face plastic belting, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A composite fabric faced plastic belt base structure comprised of a plastic belt backing and inwardly side edge folded fabric enclosure and cover elements therefor heat united therewith, said belt backing being formed of a heavy transversely stiff longitudinally flexible flat thin polyethylene base of rectangular cross-section with top and bottom faces and side edges and said elements being formed of top and bottom bias weave fabric strips with inturned side edges, said fabric strips when inturned being of the same width as the belt backing, and said fabric enclosure enclosing the top face and outside portions of the bottom face of the plastic belt backing and the fabric cover element covering the bottom face of the plastic belt backing.

2. A composite fabric faced plastic belt base structure comprised of a plastic belt backing and inwardly side edge folded fabric enclosure and cover elements therefor heat united therewith, said belt backing being formed of a heavy transversely stiff longitudinally flexible flat thin polyethylene base of rectangular cross-section with top and bottom faces and side edges and said elements being formed of top and bottom bias weave fabric strips with inturned side edges, said fabric strips when inturned being of the same width as the belt backing, and said fabric enclosure enclosing the top face and outside portions of the bottom face of the plastic belt backing and the fabric cover element covering the bottom face of the plastic belt backing, said folded edges having pinked portions overlapping one another and compressed into the plastic belt backing.

3. A composite fabric faced plastic belt base structure comprised of a plastic belt backing and inwardly side edge folded fabric enclosure and cover elements therefor heat united therewith, said belt backing being formed of a heavy transversely stiff longitudinally flexible flat thin polyethylene base of rectangular cross-section with top and bottom faces and side edges and said elements being formed of top and bottom bias weave fabric strips with inturned side edges, said fabric strips when inturned being of the same width as the belt backing, and said fabric enclosure enclosing the top face and outside portions of the bottom face of the plastic belt backing and the fabric cover element covering the bottom face of the plastic belt backing said fabric enclosure being folded around said plastic backing and then said cover elements being compressed on to said plastic belt backing.

4. A composite fabric faced plastic belt base structure comprised of a plastic belt backing and inwardly side edge folded fabric enclosure and cover elements therefor heat united therewith, said belt backing being formed of a heavy transversely stiff longitudinally flexible flat thin polyethylene base of rectangular cross-section with top and bottom faces and side edges and said elements being formed of top and bottom bias weave fabric strips with inturned side edges, said fabric strips when inturned being of the same width as the belt backing, and said fabric enclosure enclosing the top face and outside portions of the bottom face of the plastic belt backing and the fabric cover element covering the bottom face of the plastic belt backing, said belt backing having a smooth face and a corrugated and roughened face and said smooth face being covered by the fabric enclosure and said roughened face engaging the inwardly folded side edge portions of the fabric enclosure and cover.

5. A relatively stiff fabric covered thermoplastic elongated belt having a heavy plastic base with upper and lower faces and side edges of thin rectangular cross section and with a corrugated lower face, a bias weave fabric partial covering for said base having the central portion of the fabric extending over the upper face and side edges of the base and having lower pinked edges extending partly inwardly over the lower corrugated face adjacent the side edges thereof, an additional bias weave fabric strip having inturned pinked edges extending farther inwardly than the first mentioned pinked edges covering the lower face of the strip and with said pinked edges extending along the exposed central corrugated face of the base inside of the first pinked edges, said pinked edges being thermoplastically heat sealed to said corrugated face.

6. The belt of claim 5, said base being of a fifty-fifty mixture of high and low density polyethylene and the sealing of the pinked edges to the plastic base being accomplished by heated calendar rolls at a temperature of about 350° to 400° F. and said plastic containing about ½ to 2% of finely divided silicia and 5% of lamp black.

References Cited in the file of this patent

UNITED STATES PATENTS

| | | |
|---|---|---|
| 2,072,095 | Cohn | Mar. 2, 1937 |
| 2,121,836 | Steinberger | June 28, 1938 |
| 2,203,822 | Thyman | June 11, 1940 |
| 2,396,329 | Lippman | Mar. 12, 1946 |
| 2,602,932 | Eaton | July 15, 1952 |
| 2,619,648 | Hardie | Dec. 2, 1952 |
| 2,667,643 | Elman | Feb. 2, 1954 |
| 2,679,648 | Wendell | June 1, 1954 |

FOREIGN PATENTS

| | | |
|---|---|---|
| 944,782 | Germany | June 21, 1956 |
| 1,175,636 | France | Nov. 17, 1958 |